(12) United States Patent
Tetzlaff

(10) Patent No.: US 6,351,489 B1
(45) Date of Patent: Feb. 26, 2002

(54) DATA BUS COMMUNICATION TECHNIQUE FOR FIELD INSTRUMENT

(75) Inventor: David E. Tetzlaff, Minnetonka, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 08/719,843

(22) Filed: Sep. 30, 1996

(51) Int. Cl.⁷ .................................................. H03K 7/08
(52) U.S. Cl. ......................... 375/238; 375/356; 327/35
(58) Field of Search ................................. 375/219, 238, 375/239, 220, 257, 258, 259, 377, 247, 295, 360, 361, 364; 370/212, 213, 230, 235, 236, 286; 327/35, 36, 170, 175, 202, 291, 297, 299; 332/109, 112; 341/61, 143

(56) References Cited

U.S. PATENT DOCUMENTS

| | | | |
|---|---|---|---|
| 3,760,412 A | | 9/1973 | Barnes .......................... 341/53 |
| 3,852,809 A | | 12/1974 | Coker, Jr. ...................... 360/40 |
| 3,905,029 A | | 9/1975 | McIntosh ....................... 341/69 |
| 4,032,915 A | | 6/1977 | Shanks et al. ................. 341/53 |
| 4,312,070 A | | 1/1982 | Coombes et al. ............ 371/39.1 |
| 4,388,725 A | | 6/1983 | Saito et al. ................... 375/257 |
| 4,425,645 A | | 1/1984 | Weaver et al. .............. 371/47.1 |
| 4,485,448 A | | 11/1984 | Kurth ............................ 702/70 |
| 4,501,000 A | | 2/1985 | Immink et al. .............. 375/242 |
| 4,529,941 A | | 7/1985 | Lipoff ........................... 329/303 |
| 4,574,247 A | | 3/1986 | Jacob ............................ 329/300 |
| 4,592,072 A | | 5/1986 | Stewart ......................... 375/282 |
| 4,951,049 A | | 8/1990 | Whitfield ...................... 341/64 |
| 4,954,825 A | | 9/1990 | Chi ................................ 341/64 |
| 5,042,053 A | | 8/1991 | Hoppes ......................... 375/354 |
| 5,073,905 A | | 12/1991 | Dapper et al. ............... 375/354 |
| 5,081,644 A | | 1/1992 | Uchida et al. ............... 375/200 |
| 5,303,181 A | | 4/1994 | Stockton ........................ 365/96 |
| 5,315,299 A | | 5/1994 | Matsumoto ................... 341/53 |
| 5,357,196 A | | 10/1994 | Ito ................................ 324/166 |
| 5,374,927 A | | 12/1994 | MacTaggart et al. ......... 341/53 |
| 5,412,697 A | * | 5/1995 | Van Brunt et al. ........... 375/360 |
| 5,511,170 A | | 4/1996 | Abdoo ......................... 395/280 |
| 5,528,168 A | * | 6/1996 | Kleveland ..................... 326/30 |
| 5,574,396 A | | 11/1996 | Drainville .................... 327/337 |
| 5,600,634 A | * | 2/1997 | Satoh et al. .................. 370/294 |
| 5,623,518 A | * | 4/1997 | Pfiffner ........................ 375/278 |
| 5,628,001 A | * | 5/1997 | Cepuran ....................... 713/501 |
| 5,734,285 A | * | 3/1998 | Harvey ......................... 327/291 |
| 5,758,098 A | * | 5/1998 | Townsley et al. ........... 710/102 |
| 5,761,255 A | * | 6/1998 | Shi ............................... 375/360 |
| 5,787,132 A | * | 7/1998 | Kishigami et al. ........... 375/354 |
| 5,805,873 A | * | 9/1998 | Roy ............................. 395/557 |

FOREIGN PATENT DOCUMENTS

| | | |
|---|---|---|
| EP | 0 237 238 | 9/1987 |
| EP | 0 377 335 | 7/1990 |
| EP | 0 610 592 A2 | 12/1993 |
| JP | 52-14343 | 2/1977 |
| JP | 5-227035 | 9/1993 |
| WO | WO 94/15426 | 7/1994 |

OTHER PUBLICATIONS

R.E. Ziemer et al., "Principles of Communications Systems, Modulation, and Noise", Second Edition, pp. 360–362 *Digital Data Transmission*.

M. Banu and A.E. Dunlap, "Clock Recovery Circuits with Instantaneous Locking", *Electronics Letters*, vol. 28, No. 23, Nov. 5, 1992.

\* cited by examiner

*Primary Examiner*—Young T. Tse
(74) *Attorney, Agent, or Firm*—Westman, Champlin & Kelly, P.A.

(57) ABSTRACT

An apparatus for and method of serially transmitting a message between first and second devices coupled to a data or clock line in a process control device is disclosed. A first transition of the data or clock signal is generated during a signal cycle. A second transition of the signal is generated during the first signal cycle in order to control the duty cycle of the signal during the first signal cycle. If the duty cycle of the signal during the first signal cycle has a first value, then the first signal cycle is representative of a first data state transmitted between the first and second devices. If the duty cycle of the signal during the first signal cycle has a second value, then the first signal cycle is representative of a second data state transmitted between the first and second devices.

14 Claims, 4 Drawing Sheets

DATA BUS COMMUNICATION TECHNIQUE FOR FIELD INSTRUMENT

BACKGROUND OF THE INVENTION

The present invention relates generally to the field of process control instruments. More particularly, the present invention relates to systems and methods for facilitating serial communication in a transmitter.

Transmitters in the process control industry typically communicate with a controller over a two-wire circuit or control loop. The transmitter receives commands from a controller over the two-wire control loop and sends output signals representative of a sensed physical parameter back to the controller. The transmitter itself can include a number of devices such as master nodes or microprocessors, and slave nodes or peripheral devices such as sensors, valve positioners and communications circuitry. Communication between the various devices of the transmitter typically takes place on a data bus which includes a clock line and a number of data lines. Because of concerns about current consumption and complexity, it is important to minimize the number of data bus lines required for communication between the various devices.

In many process control instruments, the sensor of the process control instrument must be isolated from measurement circuitry or other devices of the process control instrument for safety purposes. An isolation barrier is used to electrically isolate the sensor. The sensor receives power and communication through the barrier and the barrier prevents large electrical discharges from impairing the measurement circuitry. Typically, the barrier only allows communication on a single data line. While necessary for safety or other purposes, inclusion of the isolation barrier reduces the number of electrical connections between the sensor and the other devices, and thus increases the complexity of communications between the sensor and the other devices.

SUMMARY OF THE INVENTION

The present invention includes first and second devices coupled to a data line. The first and second devices communicate serially by controlling a duty cycle of the data signal on the data line during cycles of the data signal. Generally, one device on the data generates a clock signal and any device on the line can modulate the clock signal to transmit data. In some embodiments, the first device is a master node (or microprocessor) and the second device is a slave node (or peripheral device). Frequently, both the first and second devices comprise integrated chips which communicate over the data line. In other embodiments, the data line is a clock line which carries a clock signal. In these embodiments, the first and second devices communicate serially by controlling the duty cycle of the clock signal during cycles of the clock signal. In some embodiments, the master node initiates the clock cycle so that the clock signal is supplied at a substantially constant frequency.

DETAILED DESCRIPTION OF THE PREFERRED EMBODIMENTS

The present invention provides a technique for transmitting data over the same data line which provides a clock signal. More specifically, a first device on a data line provides the clock signal. Any other device, or the first device, may transmit data on the line by "pulling down" the clock signal and thereby altering a duty cycle of the pulse train.

Figure 1:
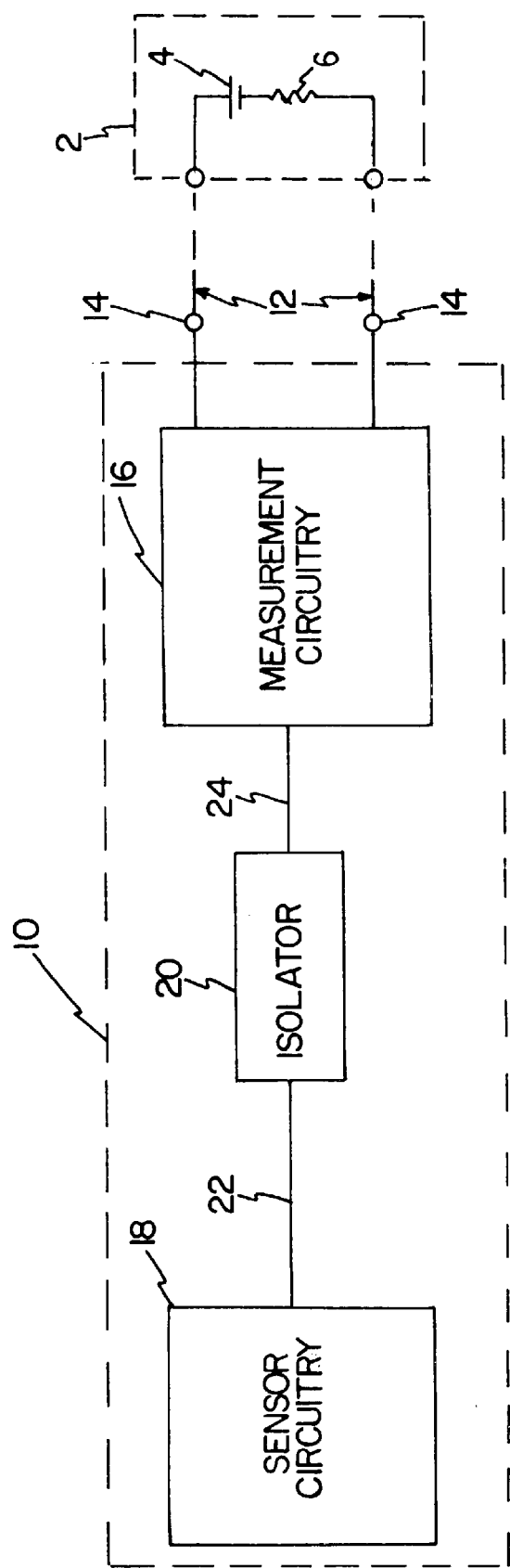
FIG. 1 is a simplified block diagram of one type of process control transmitter in which the communications techniques of the present invention can be used.

FIG. 1 is a simplified block diagram of a transmitter 10 which uses the serial communications techniques of the present invention for communicating between various parts of the transmitter. As illustrated, transmitter 10 includes measurement circuitry 16 and sensor circuitry 18. Measurement circuitry 16 is adapted to couple to two-wire loop 12 via connection terminals 14 and is used for sending and receiving information on loop 12. Measurement circuitry 16 can function as a master or slave device, or both. Examples of slave or peripheral devices include those for providing power for the transmitter from current flowing through loop 12, communications devices, signal processing devices, memory devices, and display devices. Loop 12 couples to control room 2 which is modeled as power source 4 and resistance 6. Measurement circuitry 16 can include any combination of these and other devices which conventionally communicate with each other over a data bus.

In some preferred embodiments, measurement circuitry 16 and sensor circuitry 18 are carried in separate compartments within transmitter 10, electrically isolated by isolator 20. Isolator 20 can be a transformer or other isolation barrier known in the art and required for various standards for electrically isolating sensor circuitry 18 and the process from measurement circuitry 16. Isolator 20 can also reduce ground loop noise in the measurement of the parameters sensed by sensor circuitry 18. Lines 22 and 24 couple measurement circuitry 16 and sensor circuitry 18 to isolator 20 for facilitating communications between sensor circuitry 18 and measurement circuitry 16. Frequently, lines 22 and 24 represent a single data line across which information must be transmitted serially through isolator 20. While the serial communications technique and apparatus of the present invention is particularly well adapted for communication between nodes or devices conventionally coupled to a data bus such as those in measurement circuitry 16, it can also be used to communicate on a single data line such as is required between sensor circuitry 18 and measurement circuitry 16 across isolator 20.

The present invention includes a communication technique which allows bi-directional communication over a single data line. The communication technique of the present invention is particularly suited for allowing bi-directional serial communication over a clock line, and thus reducing the number of data bus lines needed. While the present invention is discussed herein primarily with respect to a clock signal and a clock line, the methods of the present invention can also be used to encode data in signals transmitted on other data or power lines.

Figure 2:
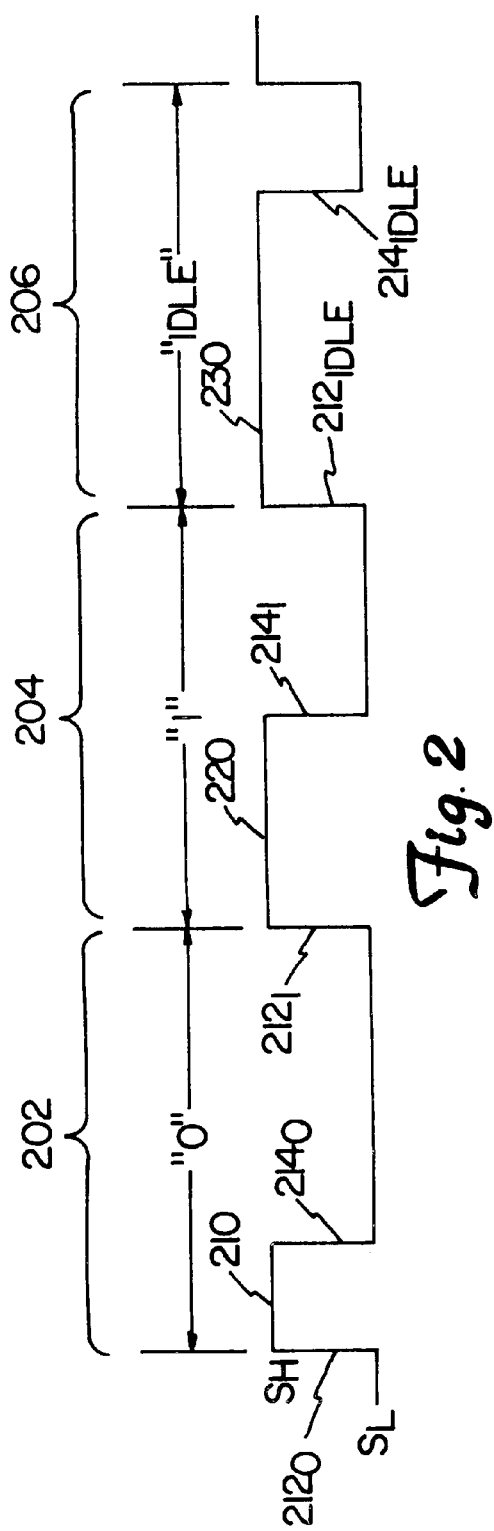
FIG. 2 is a timing diagram illustrating a coding system for facilitating serial communications on a single clock line or other data line in accordance with some preferred embodiments of the present invention.

Transmission of data is accomplished using this technique by allowing any device connected to the clock line to modulate the clock duty cycle. This technique can be implemented using a coding system having three data states such as the example shown in FIG. 2. However, the technique can easily be extended to more than three data states. Additionally, it is within the scope of the invention to use less than three data states. FIG. 2 illustrates in three consecutive clock cycles which contain encoded data bits. Clock cycle 202 having a first duty cycle is representative of a logical "0" bit. Clock cycle 204 having a second duty cycle, different from the first duty cycle, is representative of a logical "1" bit. Clock cycle 206 having a third duty cycle, different from both the first and second duty cycles, is representative of an "idle" state in which no data is being transmitted over the clock line. Alternatively stated, the different duty cycle values are representative of different data states. Thus, instead of just a first data state (i.e., logical "0" bits) and a second data state (i.e., logical "1" bits), the present invention can be used transmit multiple data states. Preferably, the clock signal remains at a constant frequency so that any system functions requiring a stable clock signal are satisfied. A clock can be derived by any device by triggering off of rising edges $212_0$, $212_1$, and $212_{IDLE}$, which are boundaries between cycles.

During transmission of zero during a clock cycle 202, rising edge or transition $212_0$ is generated to change the clock signal from a first or low data state $S_L$ to a second or high data state $S_H$. Subsequently, trailing edge or transition $214_0$ is generated in order to bring the clock signal from data state $S_H$ back to data state $S_L$. The width or duration of pulse 210 is indicative of the fact that clock cycle 202 contained an encoded "0" bit (or first data state bit). Assuming that subsequent clock signal cycle 204 is intended to transmit a "1" bit (or a second data state), pulse 220 will have rising edge (or first transition) $212_1$ and trailing edge (or second transition) $214_1$ spaced apart to give pulse 220 a duration which is different than the duration of pulse 210 from the previous clock signal cycle. As illustrated, the width or duration of pulse 220 (indicative of a "1" bit) is larger than the width or duration of pulse 210 (indicative of a "0" bit). However, in other embodiments, this need not be the case. Assuming next clock cycle 206 is intended to transmit an idle condition identifier (i.e., neither a "0" bit nor a "1" bit) or a third data state, pulse 230 will be controlled such that rising edge $212_{IDLE}$ and trailing edge $214_{IDLE}$ are spaced apart to give pulse 230 a width or duration different than the widths of both of pulses 210 and 220.

Figure 3:
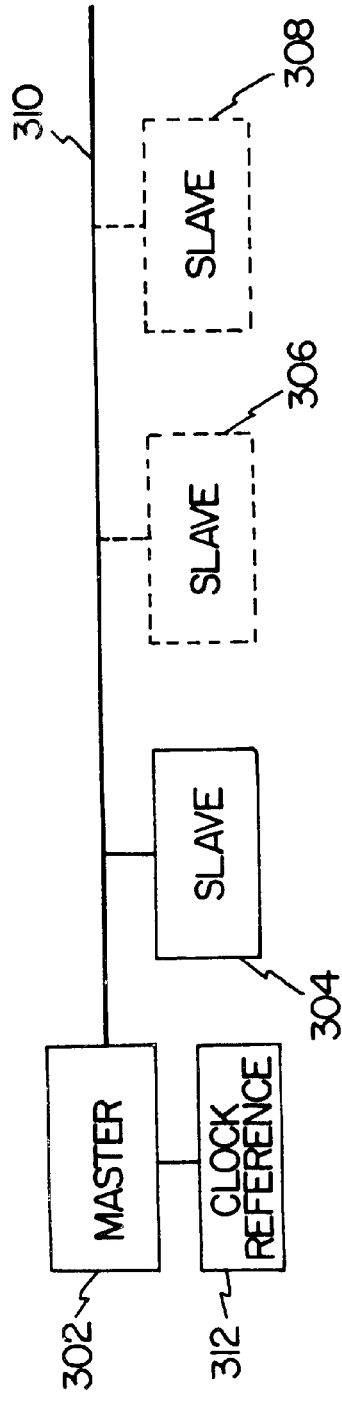
FIG. 3 is a block diagram of a system which communicates serially using the methods of the present invention.

The data transmission technique of FIG. 2 can be implemented in any appropriate manner. One technique is shown in FIG. 3. FIG. 3 illustrates a master node 302 and three slave nodes 304, 306 and 308 connected to a single line 310, preferably a clock line. The devices illustrated are intended to represent the type of devices which communicate over a data bus in a process control instrument. For example, master node 302 can be a microprocessor, a microcontroller, or any other circuitry or integrated chip (IC) devices. The slave nodes can be for example, memory devices such as EEPROMs, ROMs and RAMs for storing instructions or information from sensor circuitry 18 related to the process conditions, communications circuits or devices, analog-to-digital converters which convert process or other information into a digital format for storage or transmission, and digital-to-analog convertors for converting digital control signals into an analog format for uses such as controlling valve positioners. In must be noted that the above list of devices is provided merely as an example. Any number of other devices and/or uses for the listed devices are considered within the scope of the invention. Some or all of the above-listed devices can communicate over a single data or clock line in accordance with preferred embodiments of the present invention. Typically, the devices may all be components of a single module or housing, for example measurement circuitry 16, but this is not necessarily the case. Typically, all the devices are within the same housing communication over a shared transmission line.

As shown in FIG. 3, master node (or microprocessor) 302, slave node (or peripheral device) 304, slave node (or peripheral device) 306 and slave node (or peripheral device) 308 are connected to clock or data line 310 master node 302 and slave nodes 304, 306 and 308 can be, for example, microprocessors, analog-to-digital converters, digital-to-analog converters, memory devices, input-output circuits, temperature sensors, flow sensors, pH sensors, level sensors, pressure sensors, differential pressure sensors or modems. Clock reference signal generator 312 is optionally included and coupled to master node 302 for providing a constant frequency clock reference signal. Master node 302 generates rising edge 212 of each clock signal cycle. A physical signal technique is used such that any of devices 302, 304, 306 or 308, coupled to clock line 310, can drive clock line 310 to low logic level state $S_L$ (transition 214) at some time after a rising edge (transition 212) of the clock cycle. Thus, devices 302–308 control the duty cycle of the clock signal pulses. Examples of such physical signal techniques include a clock line with a resistor pull-up element in which each node has an open drain pull-down device, or a current loop in which any node or device on the loop can sink the current flow. However, any appropriate technique may be used to implement a data line with this signalling characteristic and ability. Other signalling techniques could also be used such as frequency, phase, etc., based techniques.

Figure 4:
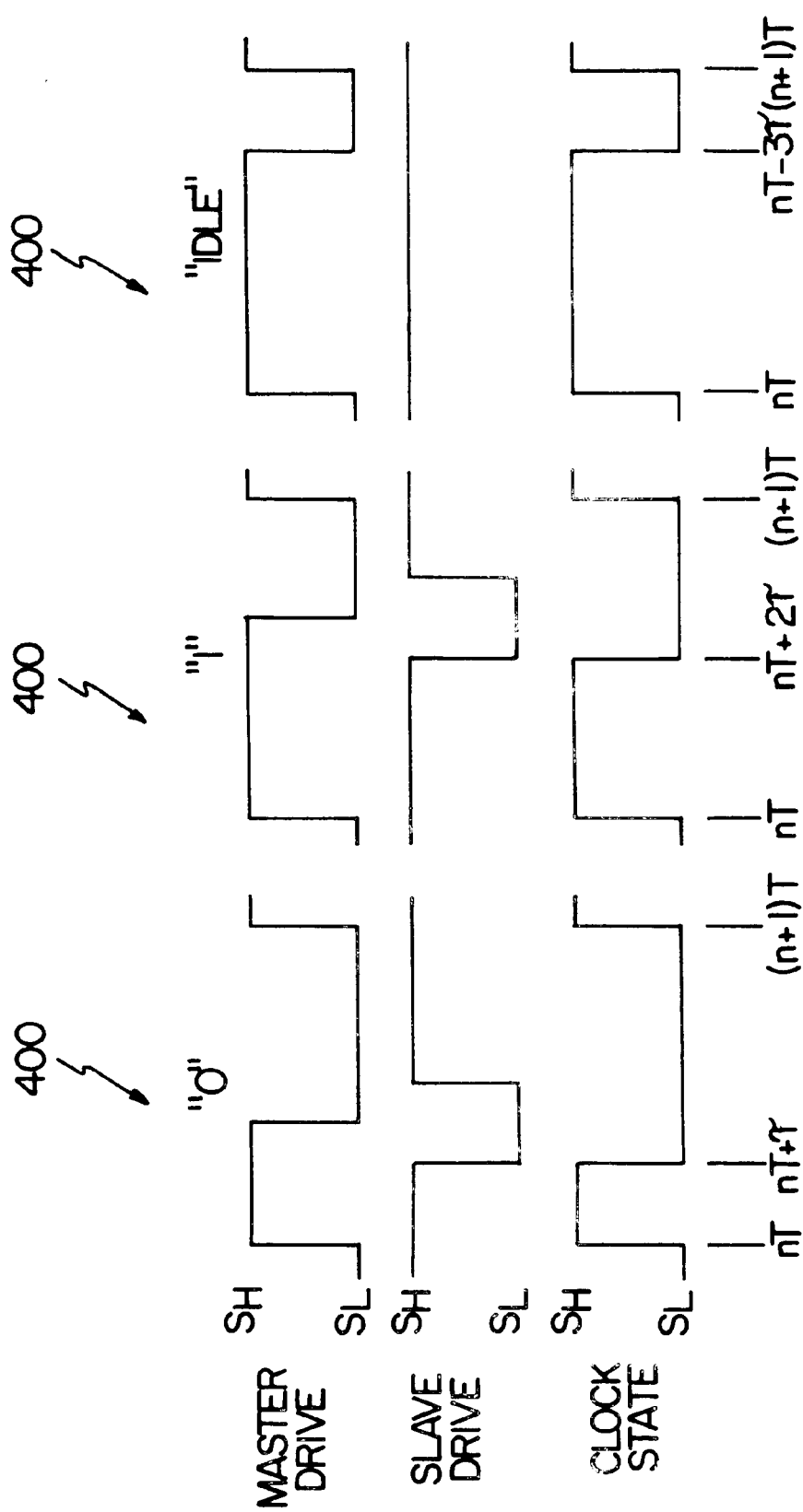
FIG. 4 is a timing diagram which further illustrates use of the coding system of FIG. 2 to facilitate serial communications on a system clock line.

Control of the signal on clock line 310 in accordance with one embodiment is illustrated in further detail in FIG. 4. FIG. 4 illustrates one clock cycle 400, beginning at time nT, for each of the three data states illustrated in FIG. 2 during clock cycles 202, 204 and 206. Regardless of which of the three data states is transmitted at time nT, master node 302, for example, drives clock line 310 to high logical level state $S_H$. (Note that any node may be used to supply the clock signal.) This initiates a first clock cycle and potentially the first bit of a transmitted message. The device that is currently transmitting (i.e., master node 302 or any of slave nodes 304, 306 or 308) causes the clock signal to drop to low logic level state $S_L$ (i.e., generates transition 214) at time nT+τ if the next bit is to be a "0" (or a first data state). The one of devices 302–308 which is currently transmitting pulls or drives the clock signal to state $S_L$ at time nT+2τ if the next bit is a "1" (or a second data state). Any state or states may be used and $S_H$ and $S_L$ are merely used for illustration.

If a slave node is transmitting data on the clock line, as soon as master rode 302 recognizes that the slave node has driven the clock signal to state $S_L$, it also drives the signal to state $S_L$. The transmitting slave node can then release its drive of the clock signal, allowing master node 302 to drive the signal to level $S_H$ at time (n+1)T, indicating the start of a second clock cycle and potentially of a second bit of a transmitted message. If clock line 310 is idle, master node 302 drives the clock signal to state $S_L$ at time nT+3τ, sending an "idle" code (or a third data state) on clock line 310 and creating the required clock transitions. Timing within period T can be derived using a combination of analog and digital techniques such as a phase-lock-loop.

Figure 5:
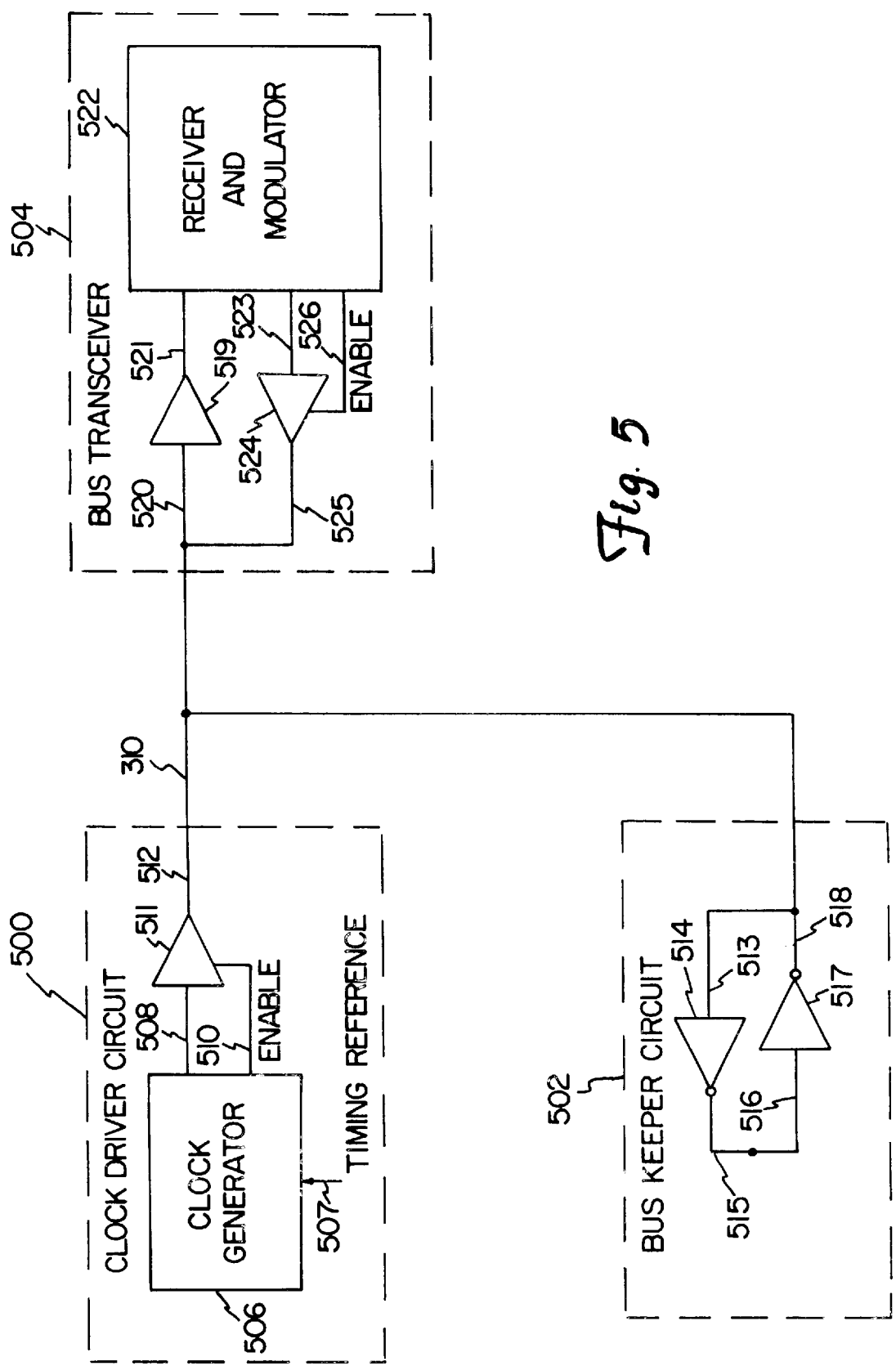
FIG. 5 is a diagram illustrating circuitry which can be used to implement the methods of serial communication in accordance with the present invention.

FIG. 5 illustrates circuitry which can be used to implement the techniques of the present invention. Shown in FIG. 5 are clock driver circuitry 500, bus keeper circuitry 502, bus transceiver circuitry 504 and clock line 310. Typically, clock driver circuitry 500 and bus keeper circuitry 502 would be included in master node 302, while bus transceiver circuitry 504 would be included in each of slave nodes 304, 306 and 308. Clock driver circuitry 500 includes clock generator 506 having clock signal output 508 and enable output 510. Clock signal output 508 is provided as an input to tri-state output buffer 511, while enable output 510 is provided as an enable input to tri-state output buffer 511. Output 512 of tri-state output buffer 511 is coupled to clock line 310.

Bus keeper circuit 502 includes inverters 514 and 517. Input 513 of inverter 514 is coupled to clock line 310. Output 515 of inverter 514 is coupled to input 516 of inverter 517. Output 518 of inverter 517 is coupled to input 513 of inverter 514 and to clock line 310.

Each bus transceiver circuit 504 includes input buffer 519, receiver and modulator 522 and tri-state output buffer 524. Input 520 of buffer 519 is coupled to clock line 310. Output 521 of buffer 519 is provided as an input to receiver and modulator 522 for receiving the data embedded clock signal. Output 523 of receiver and modulator 522 is provided as an input to tri-state buffer 524, while enable output 526 of receiver and modulator 522 is provided to the enable input of tri-state buffer 524. Output 525 of tri-state buffer 524 is coupled to clock line 310.

At the beginning of a clock period (i.e., at time nT) clock driver circuit 500 drives clock line 310 to state $S_H$, and then disables tri-state output buffer 511. Bus keeper circuitry 502 maintains the clock line at state $S_H$ until it is driven to another state by clock driver circuit 500 or a transceiver circuit 504. At time nT+τ or nT+2τ, a transceiver circuit or the clock driver circuit can drive clock line 310 to state $S_L$ if the corresponding master or slave node wishes to transmit data on the clock line. Assuming a slave node wishes to transmit data, the corresponding transceiver 504 drives clock line 310 to state $S_L$ by enabling tri-state driver 524 and applying the appropriate signal level from output 523. After clock line 310 has been driven to state $S_L$, tri-state output buffer 524 of transceiver 504 is disabled and the state of clock line 310 is maintained by bus keeper 502. If the master node is transmitting data on the clock line, clock driver circuit 500 can be used to drive clock line 310 to state $S_L$ in the same manner.

At time nT+3τ, clock driver circuit 500 enables tri-state output buffer 511 and drives the clock signal to state $S_L$ (which will already be if a master or slave node was transmitting during the clock cycle) in order to supply the trailing edge clock signal transition. At time (n+1)T, clock driver circuit 500 drives clock line 310 to state $S_H$ again, thus beginning a new clock cycle.

The timing reference signal provided at input 507 to clock generator 506 can be a digital and/or analog signal and is used to determine the times for enabling and switching the tri-state buffers. Since the transceiver output buffers are only required to drive the clock line to a single state $S_L$, tri-state buffer 524 can be simplified to an open-drain or open-collector type buffer. Other circuit configurations are also possible. For example, bus keeper circuit 502 can be replaced with a resistor to pull clock line 310 to state $S_H$. The transceiver timing would then need to be modified so that the clock line is held at state $S_L$ by the transceiver until time nT+3τ, when the clock driver output buffer is enabled and drives the clock line to state $S_L$.

The technique of the present invention allows clock and bi-directional data to share a single interconnect line, reducing the number of lines or interconnections between integrated circuits or electronic modules, and reducing the power required for data transmission. This technique can also be used to superimpose data on a power line, allowing a single line to provide power, provide clock signals, transmit data and receive data. The present invention enables bi-directional input/output (I/O) communications with very little increase in power. Because I/O circuitry is typically a primary source of power consumption, the invention reduces the overall power consumption. Because each new clock cycle can be controlled so as to always begin at fixed intervals of time, the clock signal can be stable for any functions or devices requiring a constant frequency clock signal.

The method and apparatus of the present invention can be implemented using either hardware or software to encode and decode the clock cycles in order to transmit and receive messages. The present invention is particularly well adapted for use in process control equipment such as transmitters, valve controllers and other process control field devices in general. However, the present invention can be utilized in any of a wide variety of applications in which devices on a printed circuit board or otherwise coupled to a data line are required to communicate with each other. In addition to reducing the number of electrical interconnections, the present invention can be used to communicate serially across an isolator on a single data line. The invention is well suited for carrying digital information, across such a barrier, particularly data from a sigma-delta analog to digital converter.

While the present invention is particularly suited for use in the process control environment, it can also be used in numerous other fields such as computer communications, network communications, and in providing serial communications between electronic devices in general. Further, while the present invention is described primarily with respect to encoding and decoding logical ones and zeros, the present invention can also be used to implement multi-state communications in which at least three data states are utilized. In such a system, dithering pulse durations represent different data signals. Those skilled in the art will recognize that any number of digital states may be represented in this manner. The present invention provides numerous benefits including allowing the use of fewer data lines, reducing the pin count, allowing printed circuit board size to be reduced, reducing power consumption, reducing the load on a microprocessor by allowing communication directly between slave nodes, and reducing data transmission errors which are common under certain conditions by providing a new method of encoding the transmitted data. Using the present invention, data transmission occurs at very high speed because it takes place at the clock rate, which is typically the fastest signal in the system. The power savings are realized because the clock pin is already transitioning, and therefore, additional signal transitions need not be generated.

Although the present invention has been described with reference to preferred embodiments, workers skilled in the art will recognize that changes may be made in form and detail without departing from the spirit and scope of the invention.

What is claimed is:

1. A process control device comprising:
   a transmission line adapted to carry a serially transmitted signal which has a duty cycle;
   a first device coupled to the line which provides a clock signal on the line; and a second device coupled to the line which modulates the duty cycle of the clock signal to serially communicate with the first device.

2. The process control device of claim 1 wherein the second device modulates the duty cycle of the clock signal to transmit information.

3. The process control device of claim 1 wherein the second device operates at a clock rate derived from the clock signal.

4. The process control device of claim 1, wherein the second device selectively controls the duty cycle of the clock signal such that a cycle of the clock signal having a first clock signal pulse duration is representative of a first data state and such that a cycle of the clock signal having a second clock signal pulse duration different from the first clock signal pulse duration is representative of a second data state.

5. The process control device of claim 4, wherein the second device further controls the duty cycle of the clock signal such that a cycle of the clock signal having a third clock signal pulse of a different duration from either of the first clock signal pulse duration or of the second clock signal pulse duration is representative of an idle condition in which no data is being transmitted on the transmission line.

6. The process control device of claim 4, wherein the second device further controls the duty cycle of the clock signal such that a cycle of the clock signal having a third clock signal pulse duration different from the first and second clock signal pulse durations is representative of a third data state.

7. The process control device of claim 1 wherein one of the first and second devices is adapted to couple to a two-wire process control loop.

8. The process control device of claim 1 wherein the duty cycle of the clock signal has a low value and a high value and the second device includes circuitry which controls a duration of the low value of the clock signal to thereby modulate the duty cycle.

9. The process control device of claim 1, wherein at least one of the first and second devices includes a master node.

10. The process control device of claim 1, wherein at least one of the first and second devices includes a slave node.

11. A method of serial communication between first and second devices in a process control instrument, comprising:

generating a clock signal, having a substantially constant frequency, on a clock line, wherein each of the first and second devices is coupled to the clock line; and controlling with the first device the duty cycle of the clock signal during cycles of the clock signal to thereby transmit data to the second device.

12. The method of claim 11, wherein the step of controlling the duty cycle of the clock signal during cycles of the clock signal comprises using the first device to control the duty cycle of the clock signal during cycles of the clock signal in order to transmit serially encoded data from the first device to the second device.

13. The method of claim 12, wherein the step of controlling the duty cycle of the clock signal during cycles of the clock signal further comprises controlling the duty cycle of the clock signal during individual clock signal cycles such that a clock signal cycle having a first duty cycle is representative of transmission of a first data state from the first device to the second device, and such that a clock signal cycle having a second duty cycle different from the first duty cycle is representative of transmission of a second data state from the first device to the second device.

14. A system control device comprising:

a clock line;

a first device coupled to the clock line which provides a clock signal on the clock line, wherein the clock signal has clock signal cycles and wherein the clock signal has a substantially constant frequency;

a second device coupled to the clock line; and a third device coupled to the clock line, wherein any of the first, second and third devices transmits data on the clock line by modulating the clock signal duty cycle during cycles of the clock signal.

* * * * *